Jan. 13, 1970   E. G. VANDERLIP   3,489,380
PORTABLE HELIPORT
Filed April 25, 1968   3 Sheets-Sheet 1
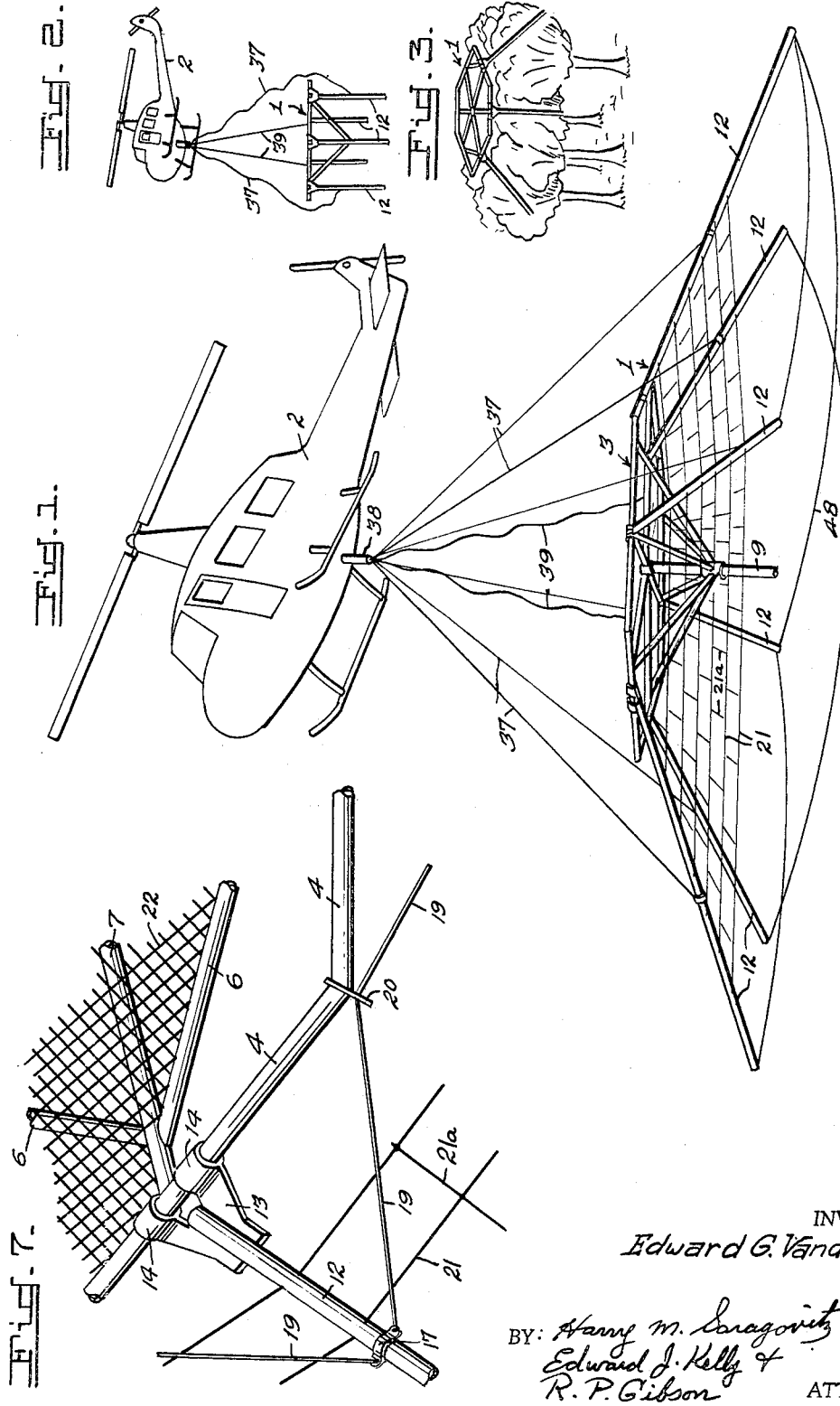
INVENTOR,
Edward G. Vanderlip
BY: Harry M. Saragovitz,
Edward J. Kelly &
R. P. Gibson   ATTORNEYS.

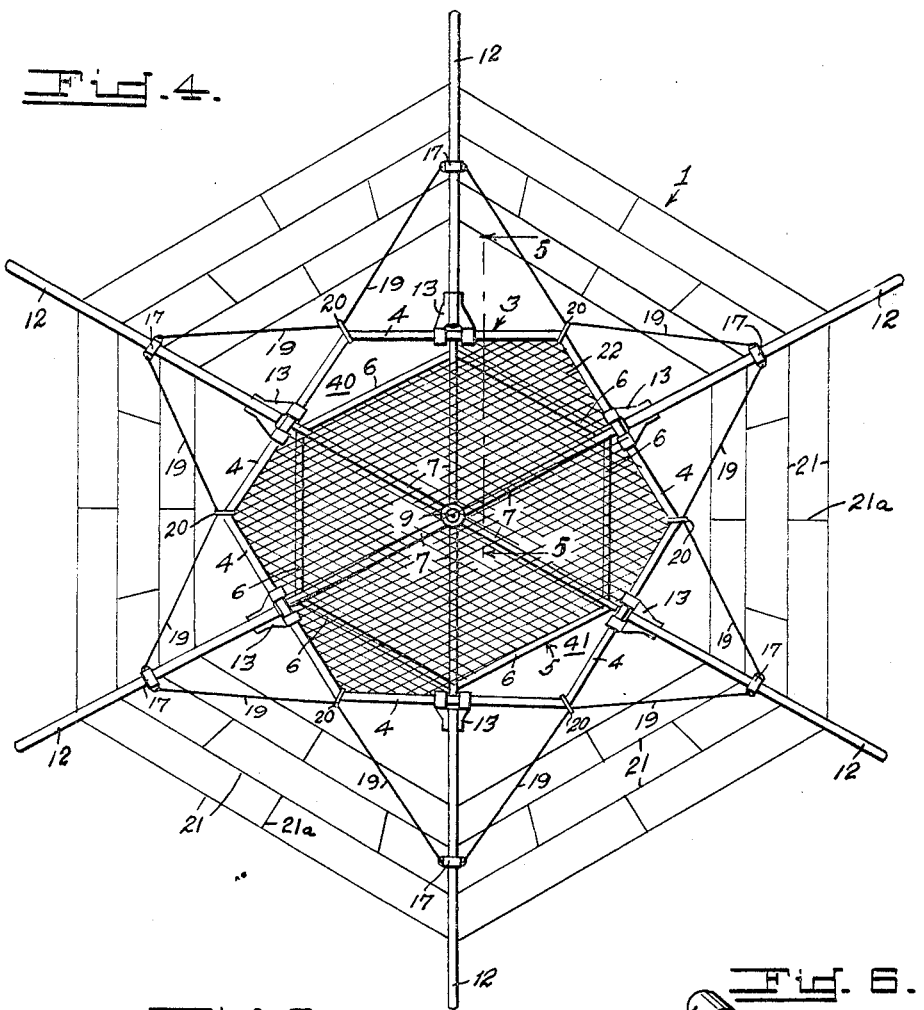
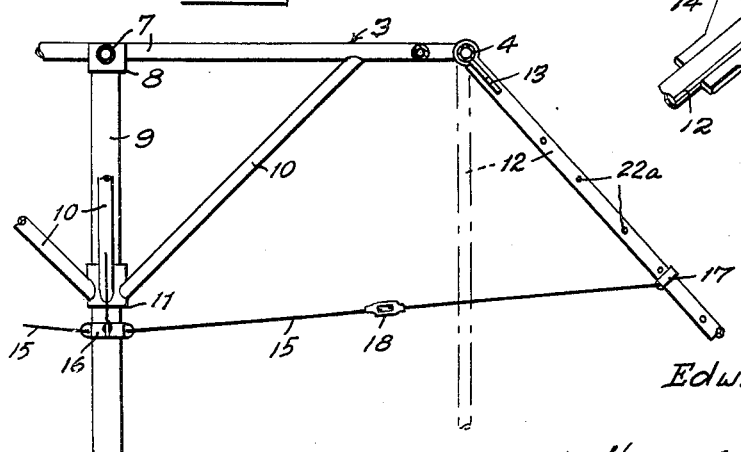
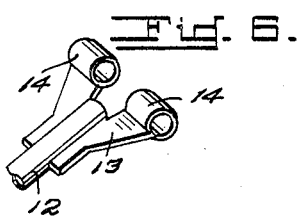

Jan. 13, 1970  E. G. VANDERLIP  3,489,380
PORTABLE HELIPORT
Filed April 25, 1968  3 Sheets-Sheet 3
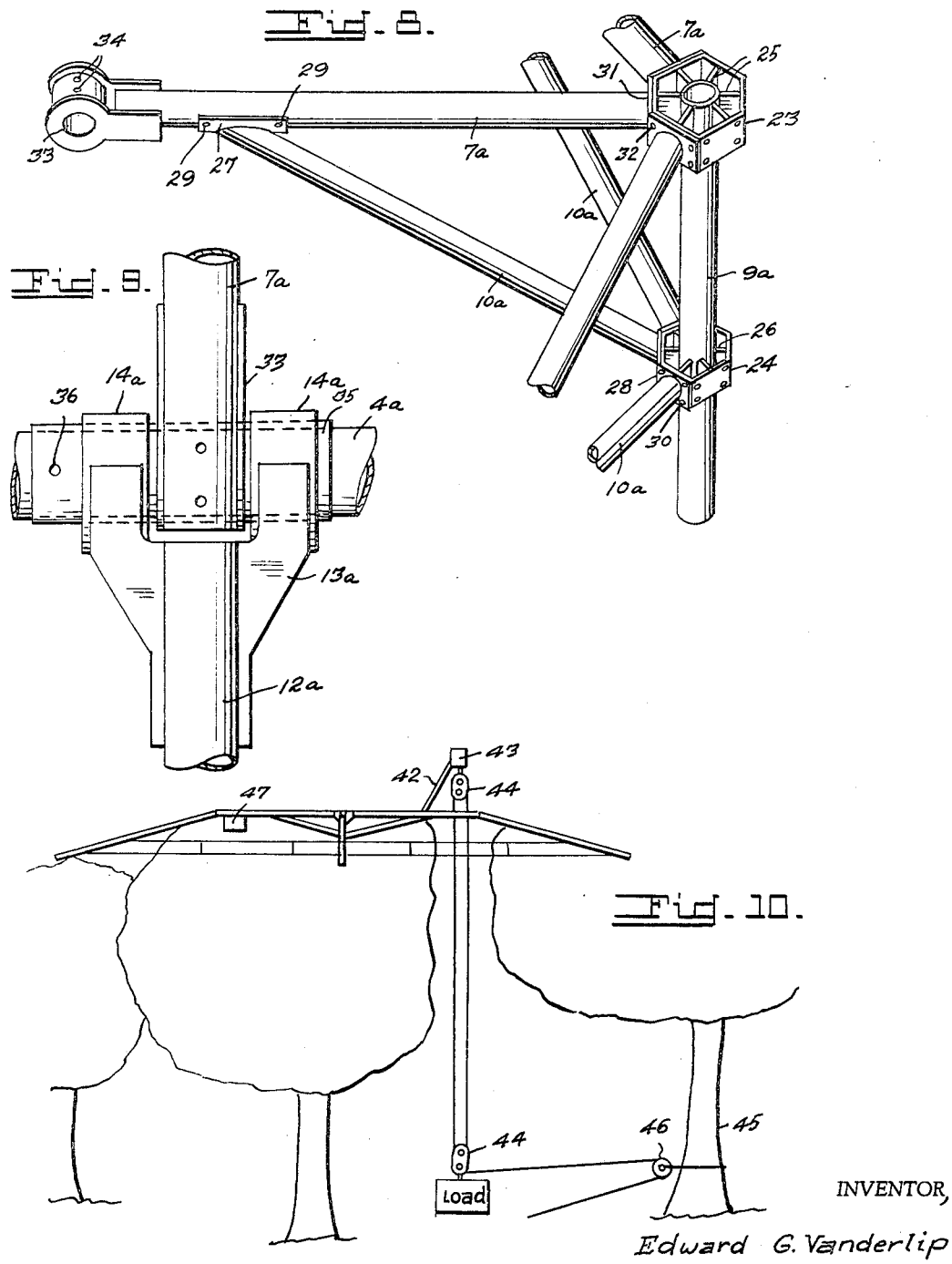
INVENTOR,
Edward G. Vanderlip
BY: Harry M. Saragovitz,
Edward J. Kelly &
R. P. Gibson  ATTORNEYS.

United States Patent Office 3,489,380
Patented Jan. 13, 1970

3,489,380
PORTABLE HELIPORT
Edward G. Vanderlip, Bel Air, Md., assignor to the United States of America as represented by the Secretary of the Army
Filed Apr. 25, 1968, Ser. No. 724,149
Int. Cl. B64f 1/22, 1/36
U.S. Cl. 244—114                              10 Claims

ABSTRACT OF THE DISCLOSURE

A portable heliport for landing troops and supplies on tree tops from a helicopter, consisting of a reinforced, hexagonal platform of tubing which is provided with a mat of steel wire mesh. Radially extending legs are hinged, one each, to the chords of the hexagon and are covered with a steel wire net.

---

The invention described herein may be manufactured, used and licensed by or for the Government of the United States of America for governmental purposes without the payment to me of any royalty thereon.

BACKGROUND

The landing of troops on land that is covered with dense foliage has been difficult, as has been experienced in jungle warfare as in Viet Nam and similar places, where there is no clearing to set the helicopter on the ground or that the ground is swampy.

SUMMARY

The present invention is designed to permit the landing of troops and supplies on a portable platform which may be placed over tree tops. The platform is to be transported by a helicopter. The platform may be quickly removed from the tree tops by the helicopter and set down in a clearing and the helicopter landed on the platform until required for future use. The platform can also be used for landing in swampy ground or in shallow water.

It is therefore a principal object of this invention to provide a means for landing troops and supplies on tree tops, swampy ground or in shallow water.

It is another object to provide a portable platform for landing troops and supplies that is quickly transported and placed by a helicopter.

A further object is to provide a portable heliport consisting of a platform of tubing having hinged legs covered with steel wire netting.

A still further object is to provide a portable heliport having hinged legs that will fold when the platform is being transported by a helicopter and that will open when ready for placement on tree tops.

These and other objects and advantages of the present invention will be fully apparent from the following description when taken in connection with the annexed drawings, in which:

FIG. 1 is a perspective view showing the heliport of this invention and in position for placement on tree tops by a helicopter;

FIG. 2 is a schematic view showing the heliport in transit with the legs folded;

FIG. 3 is a schematic view showing the heliport as placed on tree tops;

FIG. 4 is a top plan view of the heliport;

FIG. 5 is a fragmentary sectional detail taken along line 5—5 of FIG. 4;

FIG. 6 is a perspective detail of one of the hinged legs;

FIG. 7 is an enlarged perspective detail illustrating the manner of mounting one of the legs;

FIG. 8 is a perspective detail and showing a modified form of construction wherein the tubing is bolted;

FIG. 9 is a detail view of a modified form of hinged leg; and,

FIG. 10 is a schematic view showing one manner of lowering supplies from the platform.

Referring in detail to the drawings in which like reference numerals indicate like parts throughout the several figures of the drawings, reference character 1 indicates generally the heliport of this invention and which is transported by a helicopter 2.

The heliport 1 is shown in its entirety in FIG. 4 and its construction further illustrated in FIG. 5, wherein a platform of tubing is indicated generally by 3 and consists of an outer hexagon having chords 4. An inner hexagon generally indicated by 5 consists of chords 6 as shown. A series of radial tubes 7 are connected at their outer ends to a medial point to the chords 4 and at their inner ends to a collar 8 which is fixed to the top of a center post 9. Chords 6 of inner hexagon 5 are connected to radial tubes, 7 as shown. The inner hexagon 5 is positioned in offset relationship with respect to outer hexagon 3 as best seen in FIG. 4. If desired to conserve weight, guy wires, not shown could be used in lieu of tubings 6.

Platform 3 is braced on center post 9 by brace tubes 10 (FIG. 4) which are attached to radial tubes 7 and a collar 11 fixed on center post 9.

Six legs are provided and extended radially as best seen in FIG. 4. Each leg consists of a tube 12 which carry a bearing yoke 13 at their inner ends. Bearing yoke 13 is bifurcated to provide a pair of axially aligned sleeves 14. Sleeves 14 receive a chord 4 therein to provide a hinged connection for leg 12. The point of the hinged connection is located medially on a chord 4, as shown. Radial tubes 7 prevent lateral movement of yokes 13 along chords 4.

Means to prevent legs 12 from swinging out too far are provided and consists of a guy wire 15 which may be attached to a collar 16 fixed to center post 9 at one of its ends and to a collar 17 fixed to a leg 12 at its other. If desired, a turnbuckle device 18 can be employed to limit outward movement of legs 12.

Each leg 12 is further braced against side play by guy wires 19 which are attached to collars 17 and to a lug 20 located at the apex formed by a pair of chords 4, as shown.

A net of steel wire to provide support of the platform 3 when resting on the branches of trees and consists of a series of wires 21 having interlacing 21a arranged in spaced relation between legs 12. The wires 21 may pass through holes 22a in legs 12 or be fastened thereon by any suitable means.

Platform 3 is provided with a walking surface (see FIG. 4) which consists of a mat of steel wire mesh 22 chain links such as compose chain link fencing. The mat 22 may be fastened to the tubing of the platform in any expedient manner, not shown.

While the heliport shown in FIGURES 1–7 consists of a welded structure, other methods of assembling the heliport may be employed. FIGURES 8 and 9 show a modified form of assembly wherein the tubing is bolted together, the tubing arrangement being similar, the similar tubes being indicated by letter a. A pair of hexagonal boxes 23 and 24 are welded to center post 9a by webs 25 and 26, respectively. Each brace tube 10a is provided with plates 27 and 28 at each end. Plate 27 is bolted to the underside of radial tube 7a by bolts 29 and plate 28 is bolted to a flat face of box 24 by bolts 30. Each radial tube 7a is provided with a plate 31 at its inner end and plate 31 is bolted to a flat face of box 23 by bolts 32. The outer end of each radial tube 7a is provided with a sleeve 33 to receive a chord 4a therethrough. Threaded holes 34 may be provided to receive set screws, not shown, to prevent lateral movement of chords 4a in sleeve 33. Yoke 13a receives a bearing sleeve 35 through sleeves 14a and sleeve 35 is for the purpose of receiving a chord 4a of platform 3 therethrough. A threaded hole 36 in bearing sleeve 35 may be provided to receive a set screw, not shown, to secure it against lateral movement along chord 4a.

The assembly of platform 3, radial tubes 7 and brace tubes 10 could also be accomplished by having their ends threaded into sockets, etc., not shown.

In transport, the heliport 1 may be lifted by a sling attached to a helicopter 2 by stationary cables 37 which are connected to legs 12 and to the lifting hook 38 of helicopter 2, see FIG. 1. In this manner, the heliport 1 will be transported with the legs 12 extended to their full outward movement, which is limited by guy wires 15 and is ready for placement on tree tops.

If it is desired to transport the heliport with legs 12 in folded position, a second sling will be used and will be called the center sling and which, as shown, consists of cables 39 which will be attached to the tubing of platform 3 at expedient points. Cables 39 will be attached at their other ends to the drum of a winch, not shown, in helicopter 2. To transport the heliport 1, with legs 12 folded, as shown schematically in FIG. 2, center sling cables 39 will be reeled up until cables 37 are slack enough to permit legs 12 to fold down under platform 3 and the heliport 1 transported to the desired area. When ready for placement on tree tops, or for ground landing, the helicopter will hove over the landing spot and the cables 39 will be played out until cables 37 become taut and lift legs 12 to their fully extended position. Then the heliport will be set down on the tree tops or ground and both slings detached from the heliport 1.

Removal of the heliport is the reverse of the landing method.

The method of landing troops and supplies in tree tops is as follows: The heliport is landed in the tops of a clump of trees, see FIG. 3, and the helicopter will head into the wind and hover over platform 3. Then the helicopter will set down until one skid touches platform 3 and in a few feet from its outer edge. One member of the crew will step onto the platform and inspect the platform to see if it is substantially level and sturdy enough for support. The crewman will then signal the pilot and troops and supplies will be landed on the platform. After unhooking slings 37 and 39, helicopter may take off.

The heliport is now made ready for lowering troops or supplies to the ground, or for retrieving same. It will be observed from FIG. 4 that the mat 22 does not entirely cover the platform 3 but leaves two triangular openings 40 and 41. These openings are for the purpose of lowering and raising troops from the ground. A line having a grappling hook, not shown, will be thrown out by hand and when it engages a tree or branches, the line will be drawn tight and tied to one of the chords 4, preferably to the highest side of the platform. Then a support frame 42 will be attached to a chord 6 which is adjacent one opening 40 or 41, whichever is opposite to the grapple hook line, not shown. A block and tackle 44 will be attached to frame 42, or if desired, to a motor driven hoist 43. Now one of the troops will be lowered through the triangular opening and cut a path through the branches to the ground. He will then attach a line from the lower pulleys of block and tackle 44 to a tree 45 and through a pulley 46, as shown. Now the block and tackle is ready to lower the troops, one by one, and supplies to the ground.

If desired, a motor driven generator 47 may be attached to platform 3 to operate the motor in hoist 43, or the block and tackle 44 operated from the platform 3 without attaching a line to tree 45.

When quicker descent of the troops is necessary, they may climb down through the tree branches, or use ropes to lower themselves to the ground and also to lower supplies. The hoist apparatus will only be used when time is not of the essence.

The heliport can be used in shallow water if desired by attaching inflatable floats, not shown, to wire net 21, or even marshy ground.

Additional supporting means for nesting the heliport in the tree branches may be used if desired, and could consist of wire cables 48 attached to the bottom end of legs 12 and connected to one another as seen in FIG. 1.

While only preferred forms of the invention are shown and described, other forms of the invention are contemplated and numerous changes and modifications may be made therein without departing from the spirit of the invention.

What is claimed is:

1. A portable heliport for transport by a helicopter and adapted to be supported by tree tops comprising in combination, a hexagonal platform formed of tubing and having a center post; a walking surface on said platform; a series of radially extending legs hinged, at spaced intervals, to the perimeter of said hexagonal platform, bracing means for preventing side play of said legs with respect to said platform; means limiting the outward swing of said legs; a first net for engagement of tree branches extending between said legs and a second net for tree branch engagement attached to the bottom ends of said legs.

2. A portable heliport as claimed in claim 1 wherein said platform comprises a unitary framework of tubing, said framework defining an outer hexagon and including a downwardly extending center post, a series of radially extending tubes, each said tube being connected at its outer end to a medial point of a chord of said outer hexagon, and at its inner end to said center post, an inner hexagon having each of its chords connected between a pair of said radially extending tubes and at a point adjacent their outer ends whereby said inner hexagon is disposed in offset relation with respect to said outer hexagon, and an angularly disposed bracing tube connected at its upper end to the underside of each said radially extending tube and at its lower end to said center post.

3. A portable heliport as claimed in claim 2 wherein said radially extending tubes and said bracing tubes are welded at their inner ends to said center post.

4. A portable heliport as claimed in claim 2 wherein the inner ends of said radially extending tubes and said bracing tubes are bolted to said center post.

5. A portable heliport as claimed in claim 1 wherein said walking surface on said hexagonal platform comprises a mat of steel wire mesh attached to the upper side thereof, there being a pair of opposed triangular openings formed between the opposite edges of said mat and the apex of a pair of outer chords of said platform.

6. A portable heliport as claimed in claim 1 wherein each said radially extending leg comprises a length of tubing and a yoke carried by its inner end, said yoke being bifurcated at its inner end and forming a pair of tubular aligned sleeves adapted to receive a chord tube of said hexagonal platform therethrough.

7. A portable heliport as claimed in claim 1 wherein said bracing means for preventing side play of said legs comprises a cable attached at one of its ends to each side of a said leg at a point substantially below said platform and at its other end to the apex formed by a pair of chords of said hexagonal platform.

8. A portable heliport as claimed in claim 1 wherein said first net comprises a series of spaced, parallel wires passing through each said leg and wires interlacing said parallel wires at spaced intervals and being normal thereto whereby a spider web netting is formed between said legs.

9. A portable heliport as claimed in claim 1 wherein said second net comprises lengths of wire, each said length connected at the bottom of a said leg to the bottom of a diametrically opposite leg, said lengths of wire having sufficient slack to permit full extent of the swing of said leg.

10. A portable heliport as claimed in claim 1 wherein said means for limiting the outer swing of said legs comprises a cable attached at one end to a said leg and at its other end to said center post.

References Cited

UNITED STATES PATENTS 3,037,727  6/1962  Grundy _____ 244—114

OTHER REFERENCES

Science News, 89:250, Apr. 9, 1966, p. 250, Helicopter Unloads on Treetops.

MILTON BUCHLER, Primary Examiner

PAUL E. SAUBERER, Assistant Examiner